May 31, 1932.  A. SLAWINSKI  1,860,397
METHOD AND APPARATUS FOR THE DETERMINATION OF THE CONCENTRATION OF
BLOOD, MILK, AND OTHER SUSPENSIONS BY MEANS OF ELECTRIC CURRENT
Filed Dec. 31, 1928

Inventor:
Alexander Slawinski
by B. Singer
Attorney

Patented May 31, 1932

1,860,397

UNITED STATES PATENT OFFICE

ALEXANDER SLAWINSKI, OF POZNAN, POLAND

METHOD AND APPARATUS FOR THE DETERMINATION OF THE CONCENTRATION OF BLOOD, MILK AND OTHER SUSPENSIONS BY MEANS OF ELECTRIC CURRENT

Application filed December 31, 1928, Serial No. 329,614, and in Poland August 3, 1928.

This invention has the object of providing a means for the determination of the concentration of suspensions furnishing sediments, but utilizing for this determination the variations in conductivity of a liquid with a sediment, according to the position of the sediment in relation to the direction of the current.

The method is as follows:

Two small glass tubes of identical dimensions are each closed, at both ends, by small metal plates. The tubes serve as conductivity cells and the plates as electrodes. Both tubes are completely filled with the suspension and connected to a Wheatstone bridge One of the tubes is placed horizontally and the other vertically. After the sediment has been formed in the tubes, we measure $k$, the ratio of the conductivity of the liquid and sediment in the horizontal tube to the conductivity of the liquid and sediment in the vertical tube.

$h$, the height of the sediment in the vertical tube in proportion to the height of the tube.

The concentration of the suspension $w$ is a function of $k$ and $h$. It can be found in tables computed according to the following formula $$k = \frac{(1-P)(h-PQ)}{(1-PQ)(h-P)}$$

$$P = h^{\frac{1}{3}} w^{\frac{2}{3}}, \quad Q = \frac{1-0.1036w}{1+1.6438w}$$

This method is particularly adapted for the exact determination of the cell volume of blood, which can not be so accurately ascertained by other methods. It can serve also for the determination of the fat content of milk and other emulsions, and it may be employed in various scientific investigations.

The accompanying drawings show the construction of the conductivity cells and one arrangement of the whole device for carrying out the method.

Figure 1:
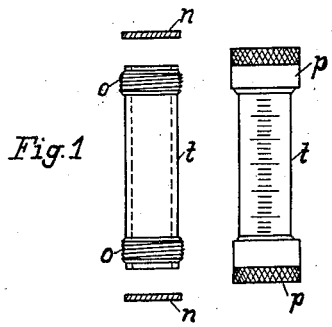
Figure 2:
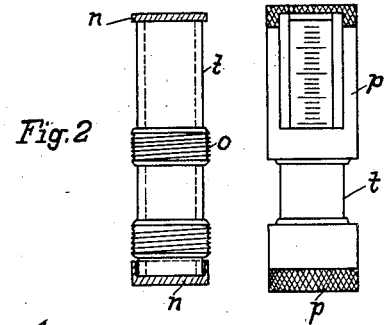

Figure 1 shows a small tube for blood tests, the tube being shown at the left open and at the right closed. In this drawing $t$ indicates the glass tube, the ends of which are accurately ground off in a plane. $o$ are rings secured to this tube and provided with screw threads. $n$ are electrodes in form of metal plates and $p$ are covers having internal threads for engaging the screw threads on the rings $o$, and for tightly pressing the plates $n$ against the ends of the tubes. The vertical tube may be graduated, so as to permit the reading of the height of the sediment Figure 2 shows a somewhat larger tube for fat emulsions. The upper cover $p$ for this tube has a cut out portion or window through which the height of the sediment may be read. The electrodes may be formed as plates, caps or the like.

Figure 3:
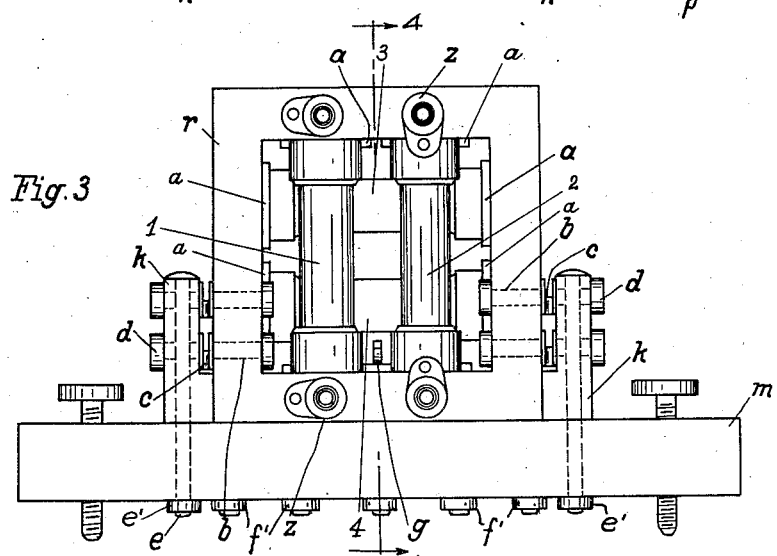
Figure 4:
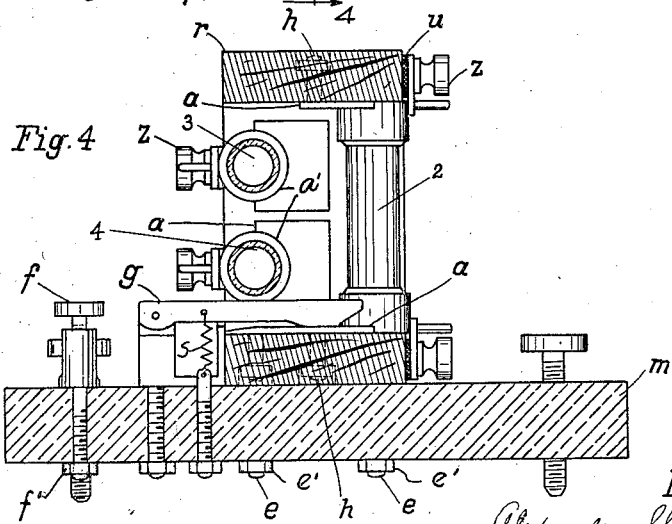

Figure 3 shows the entire device assembled in elevation and Figure 4 is a cross section on line 4—4 of Figure 3. These figures show two vertical tubes 1, 2 and to the rear of them two horizontal tubes 3, 4 one above the other disposed in the wooden frame $r$, so as to permit the simultaneous comparison of two different suspensions in the same device, or of the same suspension under different conditions.

After the tubes 1—4 have been filled and placed in the frame, this frame is mounted on the base $m$ between two stops $k$ which are each fastened to the base by two holding screws $e$.

The two vertical legs of the frame $r$ are provided near their lower portions each with two contacts screws $b$, which extend entirely through said legs and are connected by means of springs $c$ with contact screws $d$ respectively secured on said stops $k$. Each contact screw $d$ is connected with one of said holding screws $e$ which project from the under side of the base $m$ and which are each provided with a nut $e'$. Each screw $e$ is conductively connected (by any known means as well understood in the art, but not shown in the drawings to avoid confusion) with a terminal clamping screw $f$. There are therefore provided four terminal clamping screws $f$, which are arranged on the rear portion of the base $m$. Of these terminal screws only the securing nuts $f'$ are shown in the drawing, (Fig. 3) but they are similar to the screw shown in Fig. 4, which constitutes a fifth terminal screw to lead off the return current from all four tubes, while said first mentioned terminal screws are provided to be connected each with a separate incoming lead. The fifth terminal screw $f$ is conductively connected by any known means, not shown, with an arm $g$ which is pivotally mounted on the base $m$ and is normally pulled downward by a spring $s$ to engage a metal plate $a$ on the lower horizontal leg of the frame, whereby the frame $r$ is maintained in its vertical position. The other three legs are each provided with two metal plates $a$ on their inner side. The lower metal plate $a$ is conductively connected with one pair of plates $a$ on one of the vertical legs of the frame. The remaining four plates $a$ are each conductively connected with one of said four contact screws $b$ respectively on the frame. These electrical connections may be made in any suitable manner by means of thin strips of copper or the like, as well understood in the art and are not shown in the drawing. The plates $a$ are secured on the frame by means of screws $h$. Each plate $a$ has a semi-circular recess $a'$ for the reception of the cover $p$ of the tubes. Swivel nuts $z$ are adapted to firmly press the covers $p$ into said recesses $a'$ and washers $u$ of rubber or the like are arranged between said swivel nuts and said frame.

For very accurate tests it is necessary to read the height of the sediment by a microscope and the entire device will then have a different form. It then comprises a tripod or the like and a microscope, in front of which the vertical tubes are disposed. To rear are located the horizontal tubes. Illumination of the vertical tubes is effected either from the front or from the rear.

The blood, protected against coagulation, can be measured pure or diluted. The time necessary for the formation of a proper sediment is from two to twenty-four hours. The margin of error of the cell volume determination is about half per cent.

Milk, treated with a preserving substance, can be measured eighteen hours after the tubes are filled and the fat content determined accurately to within a few per cent.

Emulsions which do not furnish any sediment, as for instance cod liver oil-emulsions, must be first decomposed and this may be effected for instance by dilution with an aqueous solution of sodium bisulphate and a few minutes heating in a closed tube in boiling water. The accuracy of this determination is not great, but the method is far simpler than the chemical analysis.

In the case of blood, the concentration as stated in the tables is probably very close to the actual concentration; in the case of milk and other fat emulsions, the concentration as stated in the tables must be corrected by a coefficient to be ascertained by practical tests.

Claims:

1. A method for the determination of the concentration of suspensions consisting in producing a sediment in the suspension by filling a vertical disposed and a horizontally disposed conductivity cell with said suspension and passing an electrical current through both of said cells, measuring the ratio of the conductivities of the suspensions in said cells after the sediment has been formed, measuring the height of the sediment in the vertical cell, and then computing the concentration $w$ of the suspension from said ratio of conductivities $k$ and height $h$ through the equations:

$$k = \frac{(1-P)(h-PQ)}{(1-PQ)(h-P)}$$
$$P = h^{\frac{1}{2}} \cdot w^{\frac{1}{2}}$$
$$Q = \frac{1 - 0.1036w}{1 + 1.6438w}$$

2. A conductivity cell for the determination of the concentration of suspensions, comprising a transparent glass tube with smoothly ground ends, disk-like electrodes of uniform thickness loosely abutting the ground ends of said glass tube for closing the same and confining a suspension in said glass tube, rings secured on said glass tube and provided with external screw threads, and metal caps having internal screw threads adapted to be secured on said rings and to press the disk-like electrodes against the ends of said glass tube.

3. A conductivity cell for the determination of the concentration of suspensions, comprising a glass tube, detachable disc-like electrodes of uniform thickness closing the open ends of said glass tube, and detachable metal caps on both ends of the glass tube adapted to separately press the electrodes against the ends of said glass tube.

In testimony whereof I affix my signature.

ALEXANDER SLAWINSKI.